United States Patent [19]

Cummings et al.

[11] Patent Number: 4,574,829

[45] Date of Patent: * Mar. 11, 1986

[54] AUTOMATIC DRAIN VALVE

[75] Inventors: Ernie W. Cummings, Concord; Nick Valk, Greeneville, both of Tenn.

[73] Assignee: Drain-All, Inc., Louisville, Tenn.

[*] Notice: The portion of the term of this patent subsequent to Apr. 24, 2001 has been disclaimed.

[21] Appl. No.: 603,520

[22] Filed: Apr. 24, 1984

Related U.S. Application Data

[63] Continuation-in-part of Ser. No. 299,966, Sep. 8, 1981, Pat. No. 4,444,217.

[51] Int. Cl.4 .................................... F16K 31/34
[52] U.S. Cl. .................................. 137/195; 137/413
[58] Field of Search .................... 137/195, 204, 413

[56] References Cited

U.S. PATENT DOCUMENTS

4,444,217  4/1984  Cummings ..................... 137/195

Primary Examiner—Alan Cohan
Attorney, Agent, or Firm—Pitts and Brittian

[57] ABSTRACT

An automatic drain valve system for collecting and draining a liquid and/or contaminants within a reservoir (45A) including a level sensing float (68A). The liquid or contaminants are introduced into the reservoir through an inlet (48A) and exit the reservoir (45A) through an outlet (206). A control valve which is responsive to the liquid level contained within the reservoir (45A) includes coupled magnetic members which selectively open and close the control valve in response to the liquid within the reservoir (45A) reaching preselected levels. This control valve activates the drain valve (34A) for opening and closing the drain outlet such that the system is automatically drained upon when the liquid within the reservoir reaches a preselected level.

9 Claims, 10 Drawing Figures

AUTOMATIC DRAIN VALVE

This invention is a continuation-in-part of U.S. patent application, Ser. No. 06/299,966, filed Sept. 8, 1981, now U.S. Pat. No. 4,444,217, issued Apr. 24, 1984, there being a previously filed continuation-in-part application, Ser. No. 516,209 filed July 21, 1983 now U.S. Pat. No. 4,562,855 issued Jan. 7, 1986.

TECHNICAL FIELD

This invention relates generally to float-activated drain systems for liquid reservoirs, and more particularly to an automatic drain valve for traps used in the accumulation of condensable materials and other contaminants from pneumatic systems and the like.

BACKGROUND ART

It is conventional to use filters and separators for removing foreign objects, and condensing and removing water and other condensable liquids, from pressurized air lines and the like. Typically, such filters include an air inlet, an air outlet and a filtering element mounted between these elements in the flow path. Such filters also include a reservoir or filter bowl through which the air flow is at least partially passed causing the moisture and other condensate in the air to be collected and condensed on the inside surface of the reservoir or bowl. The force of gravity causes such condensed materials to accumulate at the bottom of the reservoir together with any other foreign objects. Periodically, this accumulated material and liquid must be discharged when the reservoir or filter bowl has become full of material.

Numerous drain systems have been devised for the discharge of the accumulated material. Two such devices are shown in U.S. Pat. No. 3,980,457, issued to J. I. Smith on Sept. 14, 1974, and in U.S. Pat. No. 3,993,090, issued to Paul M. Hankison on Nov. 23, 1976. In the first of these two patents, there are a pair of valves, a pilot valve and a discharge valve. The pilot valve is magnetically operated and includes a float which moves in response to changes in the liquid level within the reservoir to magnetically open and close a fluid valve in response to that liquid level. Opening of the fluid valve may thereafter cause the opening of the second valve for other operations such as the drainage of the reservoir. In the second of the patents, there are also two valves, a pilot valve and a discharge valve. In this device, a float is held in a submerged condition for a time to create a superbuoyancy condition. When a sufficient superbuoyancy condition is achieved, the float suddenly rises to the surface of the liquid causing a snap action of the pilot valve. This opening of the pilot valve then quickly opens the discharge valve for the removal of material contained within the reservoir. In both of these patents, the pressure of the pneumatic system to which the trap is attached is the driving force which opens the discharge valve.

Since the operating valves and the drain valves are located within the reservoir, various disadvantages exist in the devices described in the above-identified patents. For example, the discharge valve or its operator may be damaged by, or may collect, dirt and other abrasive materials during the discharge operation. Also, they may be affected by corrosive action since they are in contact with the collected material. These deleterious conditions affect the future correct operation of the discharge valve. Further, since the discharge valve is located within the reservoir as part thereof, it is a difficult and an expensive procedure to replace components of this discharge valve. Since the pilot valve also is operated by the air pressure of the pneumatic system to which the reservoir is connected, this valve may become contaminated with some of the impurities.

Still other of these known devices for accumulating condensate and impurities from pneumatic systems are described in the background sections of the above-identified patents.

Accordingly, it is an object of the present invention to provide a drain system for a reservoir utilized in the accumulation of condensate, and impurities from pneumatic systems, wherein the discharge valve is located externally to the reservoir to facilitate replacement of components, if necessary.

It is another object of the present invention to provide a discharge valve for the reservoir which incorporates a self-cleaning feature whereby dirt and other such impurities have negligible effect on valve operation and provides for a positive shut-off of every cycle without leaks therefrom.

Another object of the present invention is to provide a pilot or control valve housed in a separate chamber integral with, but separate from, the main reservoir area where collected material is stored whereby the control valve is not affected by pressure, dirt and other contaminants which would cause most pilot valves to fail.

It is still another object of the present invention to utilize a pair of magnets of normally opposite polarity, one in a valve plug and one in a float, that are magnetically coupled such that one of the magnets effectively reverses polarity when the float within a liquid reservoir reaches the uppermost position, thereby providing a snap opening of this valve. These magnets are so positioned that at the lowest level of the float, the magnet is again effectively reversed in polarity causing the rapid closing of the associated valve.

Other objects and advantages of the invention will become apparent upon reading the hereinafter detailed description with reference to the drawings.

DISCLOSURE OF THE INVENTION

In accordance with the invention, an automatic drain valve system is provided for the discharge of accumulated condensed materials and other foreign matter from a reservoir when the reservoir is filled to a predetermined level. The valve for the actual draining is positioned externally to the reservoir. Filtered pressurized air, from a separate source, is fed to the operator of the device valve and to a control valve isolated from, but within the reservoir itself. This pilot or control valve is normally maintained in a closed position by a pair of magnetically-coupled magnets, one being in the control valve plug and one in the float surrounding the control valve within the reservoir. The polarity of these magnets is chosen such that when the float is in the lowest position or is rising within the reservoir, the magnets oppose each other. This causes the control valve plug to close against the control valve seat. When the float reaches its uppermost position, the relative polarity of one of the magnets is effectively reversed causing the control valve plug to move away from the control valve seat thereby permitting pressurized air flow to the drain valve operator with the result that the drain valve is suddenly opened. This effective reversed polarity of one magnet persists until the float reaches its lowest position at which time the polarity effectively reverses. This reversal causes the control valve plug to again move against the control valve seat and the air pressure to the drain valve operator is reversed and/or vented causing the drain valve to suddenly close. The pressure at the control valve determines when the drain valve operator is to be moved from a closed to an open position and then returned to a closed position.

BEST MODE FOR CARRYING OUT THE INVENTION

Figure 1:
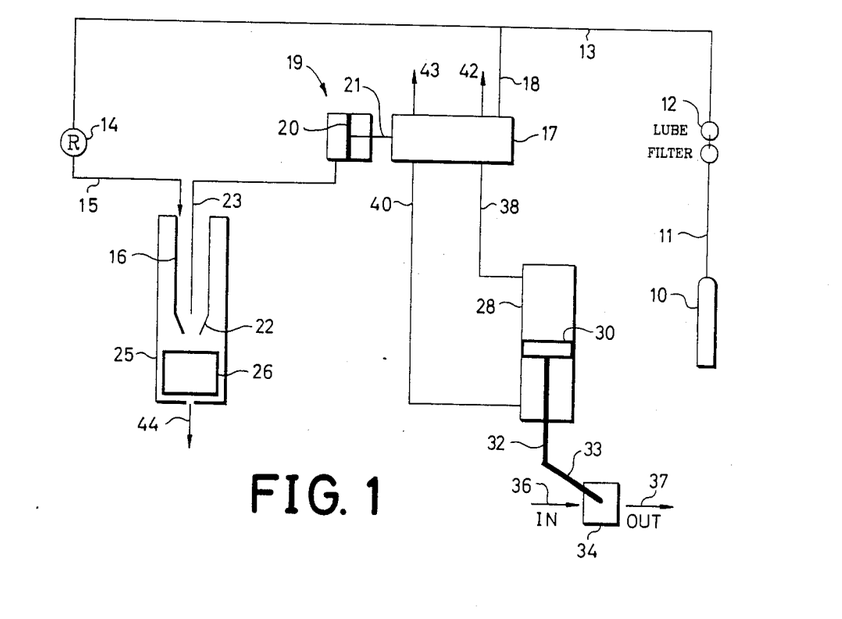
FIG. 1 is a schematic flow diagram of a pneumatic system which can incorporate the present invention.

Referring now to FIG. 1, a schematic flow diagram is shown for a pneumatic system used to operate the present invention. Air from a pressurized source 10 is fed through line 11 to a conventional filter lubricator 12 and thence through line 13 to a regulator 14. The output (e.g., 5 psi) from the regulator 14 feeds through line 15 to the interior of proximity sensor tube 16. The tube 16 terminates in a valve seat 22. Filtered pressurized air is also fed to a multi-ported valve 17 through line 18. A typical low pressure valve for this application is Clippard Instrument Laboratory Model R-405. This valve 17 has an operator 19 which consists of a piston 20 and a piston rod 21. The volume above the piston 20 is connected by a line 23 to the center of the proximity sensor tube 16 adjacent the valve seat 22. Proximate the valve seat 22 is a valve plug 26. This valve plug 26 is either in contact with or displaced from the valve seat 22 by the method described hereinafter. As will be described below, the proximity sensor tube 16 and its valve seat 22 together with the valve plug 26 are contained within a separate closure 25.

External to the reservoir, in one embodiment, is a pneumatic cylinder 28 containing an axially-movable piston 30. This piston 30 is provided with a piston rod 32 extending through an end of the cylinder 28, and the outward end of the rod 32 is pivotally connected to a discharge valve operator arm 33 of valve 34. An inlet line 36 to valve 34 connects to a reservoir to be drained (not shown), and an outlet line 37 connects to any appropriate drain or catch basin. The cylinder 28 is provided with pneumatic lines 38, 40, one on either side of piston 30 which lines are connected to appropriate ports of the valve 17. The valve 17 is provided with vent lines 42, 43, respectively connectable to lines 38, 40. Also, enclosure 25 on the proximity valve components is provided with a vent line 44.

Figure 2:
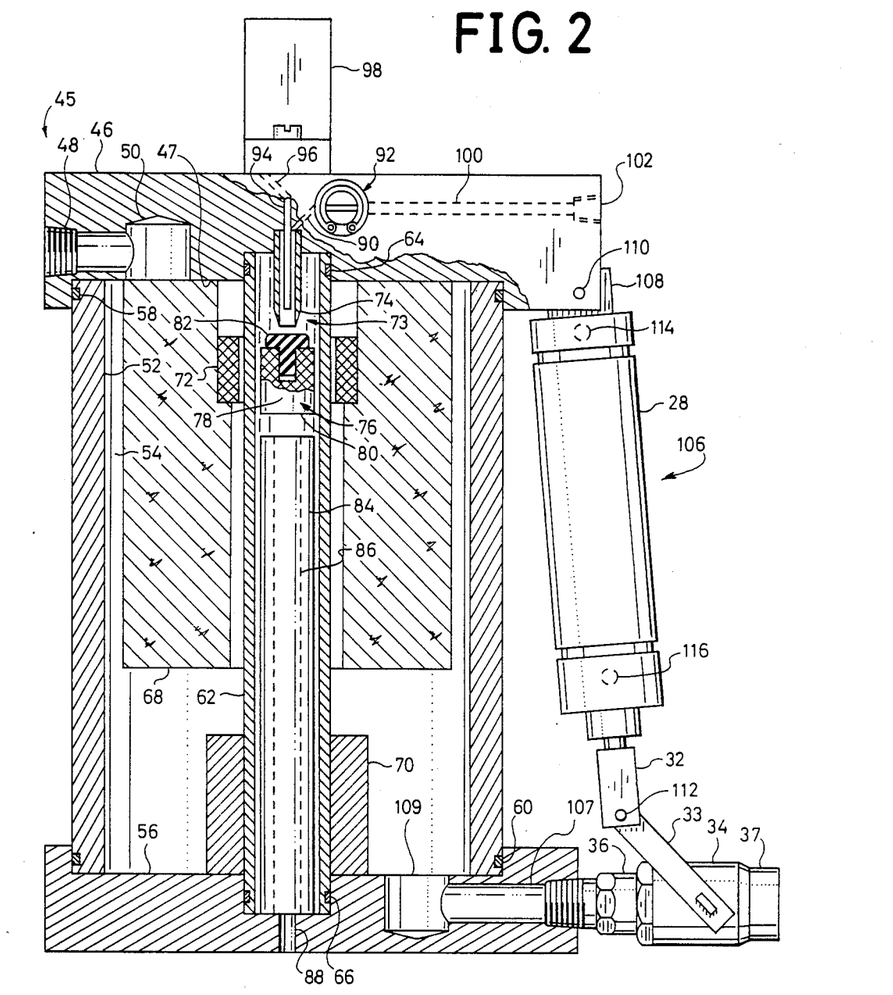
FIG. 2 is a vertical cross-sectional view of a unit incorporating features of the present invention showing the control valve, the magnets, and the discharge or drain valve and an operator.

A cross-sectional view of the present device for accumulating condensable materials and other foreign matter from a pneumatic system, together with means for draining the reservoir of this device, is shown in FIG. 2. A separator/reservoir 45 of this embodiment has a top housing 46 which is provided with an inlet 48 for connection to any pneumatic or other gas system from which condensate and foreign materials are to be removed. Formed within the lower face of the housing 46 is an arcuate channel 50 which serves as a moisture condenser/filter as condensable collect on the surface thereof. Depending from below, the housing 46 is a cylindrical shell or sleeve 52 which forms the wall of the reservoir. The bottom of the reservoir is formed from base plate 56, and seals 58, 60 are inserted between the shell 52 and the top housing and bottom plate, respectively. Axial bolts or other means are provided (see FIG. 7) for maintaining the sleeve 52 firmly clamped between the header 46 and the bottom plate 56. This structure creates a reservoir volume 54 as shown. The aforementioned channel 50 communicates with this reservoir volume 54 whereby the volume 54 is used to collect the condensate and other material that are removed from the pneumatic system. Mounted within the reservoir is a hollow cylinder 62 (corresponding to element 25 of FIG. 1) which is sealed to the upper housing 46 with an appropriate seal 64 and to the bottom plate 56 with an additional seal 66. Generally surrounding the cylinder 62 is a buoyant member 68 which is slidable along the cylinder 62 from a top position wherein the top of the buoyant member or float 68 is in contact with the under surface 47 of the housing 46, to a bottom position wherein the bottom surface of the float 68 rests against a float stop 70. The annular opening, which is sufficient to minimize the collection of foreign materials, within the float 68 can be provided with guides (not shown) to assist in the movement of the float between its most distant positions. Mounted within the top of the float or proximate thereto is an annular magnet 72 (e.g., $2 \times 1.3 \times 1$ in.) which encircles the cylinder 62.

Within the upper portion of the sleeve 62 is a proximity or control valve 73 which consists of a valve seat 74 and a valve plug 76 (equivalent to elements 22, 24 of FIG. 1). The valve plug 76 in turn consists of a cylindrical magnet 78 (e.g., $0.87 \times 1$ in.) encased in a protective layer 80. The top of the plug 76 is provided with a resilient cap or plug 82 for contact with the valve seat 74. Positioned beneath the valve plug 76 is a cylindrical stop in the form of a hollow cylinder 84, the purpose of which will be described hereinafter in connection with the relationships of the magnet 72 and 78. The stop 84 is provided with a central passageway 86 which communicates with an outlet passage 88 (vent 44 of FIG. 1) through the base plate 56. Filtered air is supplied to the interior of the pilot valve seat 74 through a tube 90 from regulator 92. Coaxially mounted within the pilot valve 73 is a capillary tube 94 which communicates through passageway 96 to a four way valve 98 (the valve 17 of FIG. 1). Air is supplied to the valve 98 and to the regulator 92 by means of an inlet 102 and a passageway 100. Although not shown in this figure, the valve 98 communicates with additional passageways in the header 46 for the purposes described hereinafter.

Shown at the right of the FIG. 1 is a drain valve 34 and an operator system 106. This operator system 106 is made up of the aforementioned cylinder 28 which is attached to the top header 46 with a clevis bracket 108. The clevis bracket is mounted to the top header with a pivot pin 110. Extending from the bottom of the cylinder 28 is the aforementioned piston rod 32 which is pivotally connected to a valve operator 33 of valve 34 with a pin 112. The valve 36, in turn, is connected to the bottom header 56 by a fitting in the inlet line 36. The fitting communicates with passageway 107 within the base plate 56, with this passageway communicating with a sump 109. The outlet from valve 34 leads through conduit 37 to an appropriate collection vessel for the products drained from the reservoir. Although not shown, pneumatic lines for the operation of the piston within the cylinder 28 are attached to the cylinder at ports 114 and 116. The purpose of these lines will be described hereinafter.

Figure 3:
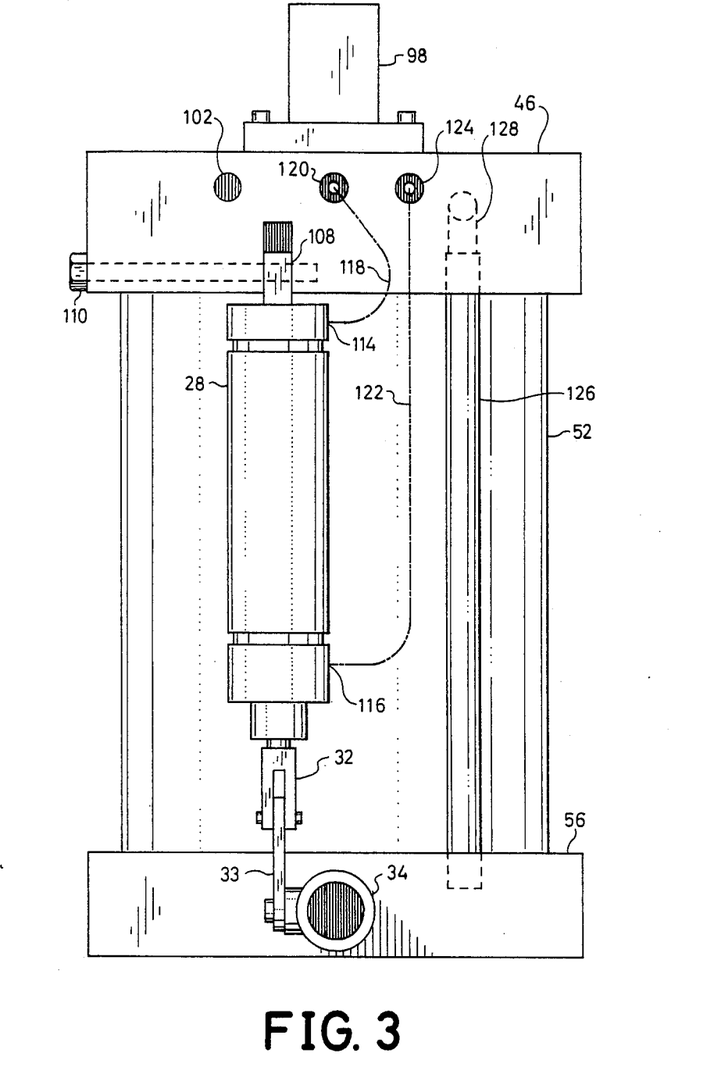
FIG. 3 is a plan view of a unit constructed in accordance with the present invention taken at right angles to the view shown in FIG. 2.

A side elevational view of features of the subject invention is shown in FIG. 3. It may be seen that the inlet port 114 at the top of cylinder 28 is connected by a pneumatic line 118 (same as line 38 of FIG. 1) to a port 120 which communicates with the aforementioned valve 98 (FIG. 2). In a similar manner, the second port 116 at the bottom of cylinder 28 communicates through a pneumatic line 122 (same as line 40 of FIG. 1) to a port 124 in the top of header 46 which, in turn, is likewise connected to the valve 98. This figure also shows an optional liquid level indicator line 126 which communicates with an internal passageway 128 to the internal volume 54 of the reservoir.

Referring again to FIG. 1, the pneumatic operation of the subject invention can be described with reference to this schematic drawing. Normally, pressurized air is fed from source 10 or other appropriate source to the filter and lubricator 12 and then to the proximity valve 17 through corresponding lines 13 and 18. This low pressure air is also admitted through line 13 and regulator 14 into the internal volume of the pilot valve seat 22 through line 15. When the valve plug 26 is firmly seated against the valve seat 22, the pressure existing in line 15 also exists in line 23 which is connected to the valve operator 19 of control valve 17. This pressure in line 23 causes the piston 20 and piston rod 21 to move the control valve 17 so as to provide a pressure through line 40 to the volume in cylinder 28 below the piston 30. At the same time, the volume above the piston 30 in the cylinder 28 is connected through line 38 to the exhaust line 42. This results in maintaining the piston 30 in an elevated position within the cylinder 28 and thus the piston rod 32 moves the valve operator 33 such that valve 34 is in a closed position. Thus, the line 36 from the reservoir is closed from the conduit 37. When, however, the valve plug 26 is displaced from the valve seat 22 in a manner to be described hereinafter, the air through line 15 entering the valve seat 22 is exhausted through line 44. Under these conditions, the pressure in line 23 is substantially reduced. This causes the valve 17 to reverse the air flow to the cylinder 28. Accordingly, air pressure is admitted to the cylinder 28 through line 38 and the volume below the piston 38 is exhausted through line 40 and vent line 43. This causes a downward movement of the piston 30 and the piston rod 32 which in turn moves the valve operator 33 to fully open the valve 34 thereby permitting full flow through line 36 to line 37 and thereby draining the reservoir. When the reservoir is almost drained, the pilot or control valve plug 26 again contacts the valve seat 22 and thereby the initial condition occurs whereby drain valve 34 is again closed, maintaining a water seal and preventing compressed air from escaping.

Figure 4:
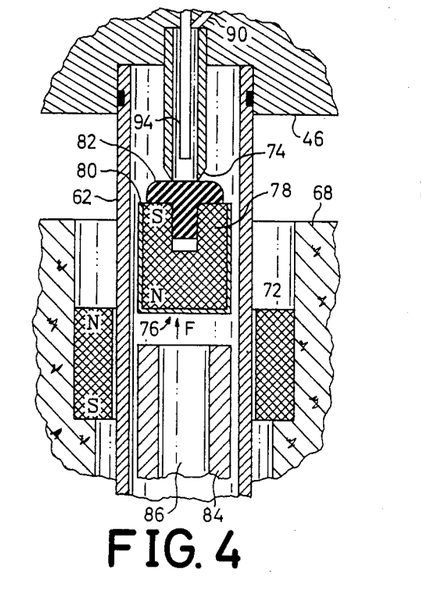
FIG. 4 is a fragmentary view of the pilot or control valve and the float of the present invention when the float is in the most downward position and is about to rise due to accumulation of condensable liquid in the reservoir.
Figure 5:
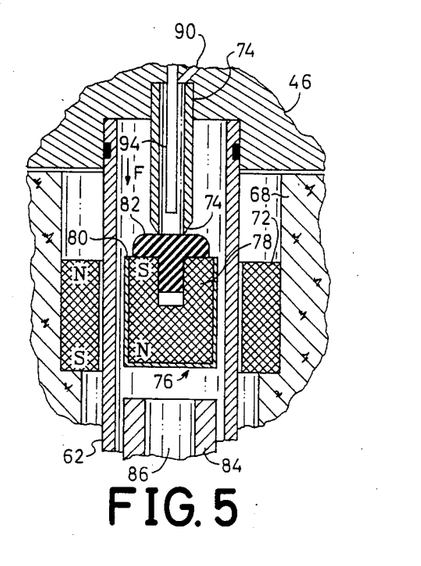
FIG. 5 is a fragmentary cross-sectional view of the present invention as the float reaches the uppermost position causing the reversal of the polarity of the magnet mounted within the valve plug.
Figure 6:
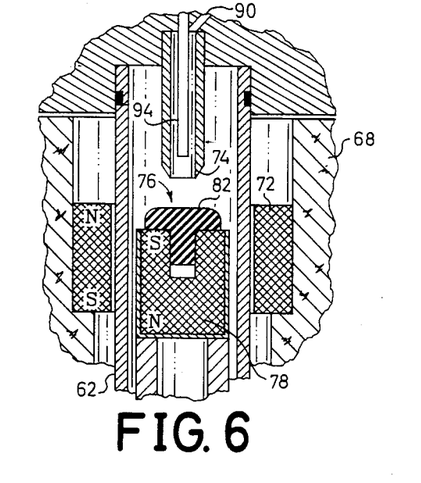
FIG. 6 is a fragmentary cross-sectional view of a control valve and float after the reversal of the magnetic polarity and during the downward movement of the float due to discharge of accumulated liquid from the reservoir.

The operation of the pilot valve to accomplish the opening and closing of the valve 34 can be understood by referring to FIGS. 4 through 6. Referring to FIG. 4, taken together with FIG. 2, the pilot valve is shown when the float 68 is in its lowest position as established by the float stop 70 (see FIG. 2) or is rising in the reservoir. The spacing of the float stop 70 and the valve plug stop 84 are such that magnets 72 and 78 are always magnetically coupled such that their normal reverse polarity (as indicated) causes the valve plug 76 to be raised firmly against seat 74 (or seat 74A in FIGS. 9A and B). Thus, the sealing member 82 is firmly forced against the valve seat 74. As discussed above, this maintains the drain valve 34 (see FIG. 2) in a closed position. As indicated, the magnetic force F is in an upward direction in this position.

Referring now to FIG. 5, this illustrates the float 68 in the most upward position; that is, against the under surface of the header 46. When in this position, the magnets 72 and 78 are substantially aligned in height. The magnetic field generated within magnet 72 causes an effective reversal in the polarity of the magnetic field within magnet 78. This effective reversal is not instantaneous due to the hysterisis of the magnet 78. However, when polarity of the magnetic field within magnet force F is effectively directed downwardly whereby the valve plug 76 is removed from the valve seat 74 to rest against the stop 84. Air pressure within the valve seat 74 is thereby released around the periphery of the valve plug 76 and is permitted to exit through channel 86 and passageway 88. As discussed above, this permits an opening of drain valve 34 whereby the float 68 is lowered to the initial position as shown in FIG. 4. At the lowest position of float 68 within the reservoir, the polarity of magnet 78 is again effectively reversed bringing about conditions whereby the valve plug 76 is again forced against the valve seat 74. The intermediate condition wherein the float is in an elevated position, but dropping as the pilot valve is opened, is illustrated in FIG. 6. This same magnetic coupling and polarity reversal occurs in the operation of the unit shown in FIG. 9 which incorporates magnets 72' and 78'.

Figure 8:
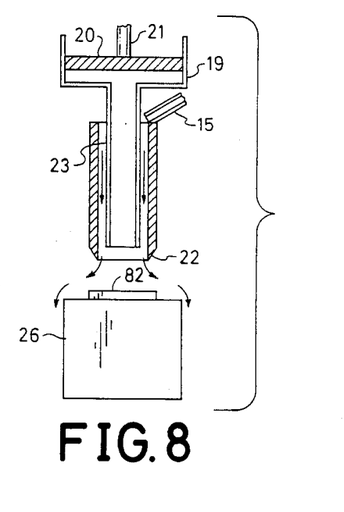
FIG. 8 is a schematic drawing further illustrating the operation of the control valve of the subject drain valve system.

It will be recognized that the magnet polarity reversal which occurs at the top and bottom extreme travel of the float 68, and the delay imparted by the hysterisis during this reversal, operates the pilot valve in a "snap on" and "snap off" manner. It is essential that the pilot valve operate reliably whenever the float 68 reaches an exact position within the reservoir. The particular construction shown in FIG. 2 has been found to provide this reliable operation. The specific operation thereof can be explained in more detail by reference to FIG. 8. As discussed above with reference to FIG. 1, when the valve plug 26 is in position such that its cap 82 is against the valve seat 22, regulated air pressure entering through line 15 creates an equal pressure in capillary 23. This pressure within capillary 23 causes the piston 20 in control valve operator 19 and the piston rod 21 attached thereto to move the aforementioned control valve 17 (see FIG. 1) in a direction to provide the needed air pressure to the drain valve operator to maintain the drain valve in the closed position.

However, when the valve plug 26 is rapidly removed downwardly away from the valve seat 22 by the operation of the aforementioned magnets, the air flowing through line 15 is vented through the valve seat 22. This venting of the air creates a venturi action about the capillary 23 which causes a rapid decrease of the pressure therein. This reduction of internal pressure within the capillary 23 causes the piston 20 and the piston rod 21 of the control valve operator to move axially (downwardly in this FIG. 8) so as to move the control valve and reverse the application of pressure to the drain valve operator. When the valve plug 26 rises to fully contact the valve seat 22, the pressure in capillary tube 23 is substantially increased giving a positive action of valve 17 and thus to the drain valve 34. This combined rapid operation of the pilot valve and the control valve operator 19 occurs at precise times for each operation of the pilot valve and thereby assures that the reservoir will not overfill nor drain at a time prior to substantial filling.

The rapid and complete manner of operation of the components is important to the operation of the present invention for several reasons. The main benefit of the rapid operation is in the corresponding rapid operation of the piston within the cylinder 28. The air supply provided to the volume above the piston 30 through port 114 is multiplied by the area of the piston whereby considerable force is available to move the piston rod 32 axially away from cylinder 28, and the connecting rod 33 rapidly operates valve 34 for the draining of the reservoir. Through rapid operation of this valve, full flow condition exists quickly whereby all contents of the reservoir are forced through valve by the pressure of the pneumatic system to which the subject invention is attached. This assures a rapid removal of the contents of the reservoir brought about by the pressure in the pneumatic system. Again, when the reservoir is almost empty, the valve 34 is rapidly closed thereby minimizing any erosion of its components or the accumulation of residual material exiting from the reservoir and maintaining a liquid seal at all times. Since the valve 34 is a rotary valve and power assisted, any foreign material that may be present is cleared from the surfaces and thereby cannot prevent the valve from closing as in the case of an axially moving valve.

Figure 7:
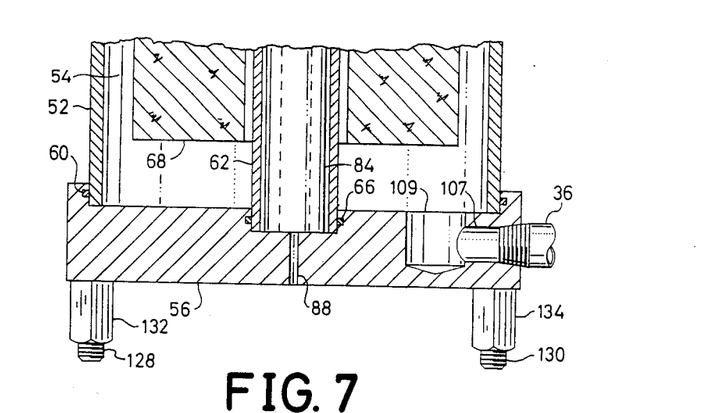
FIG. 7 is a framentary cross-sectional view of another embodiment of the lower portion of the reservoir of the subject drain valve system.

Another embodiment of the reservoir portion of the present invention is illustrated in FIG. 7. In this embodiment, the cylindrical wall 52 of the reservoir is shortened such that the float stop 70 (see FIG. 2) is not required. Alternately, the float 68 may be lengthened accordingly such that the bottom plate 56 forms the bottom stop for the float. This particular construction has the advantage that when the float 68 reaches its lowermost travel, that is, against the top of the bottom plate 56, the float closes the opening of the sump 109. This closure of sump 109 further enhances the shut off of the fluid flow out through passageway 107 and connector 36 leading to the drain valve (not shown). This construction principally prevents air pressure from leaving the reservoir prior to the automatic closing of the rotary valve. Shown also in FIG. 7 are the typical bolts 128, 130, and the respective nuts 132, 134 that are utilized for holding the reservoir together.

Figure 9A:
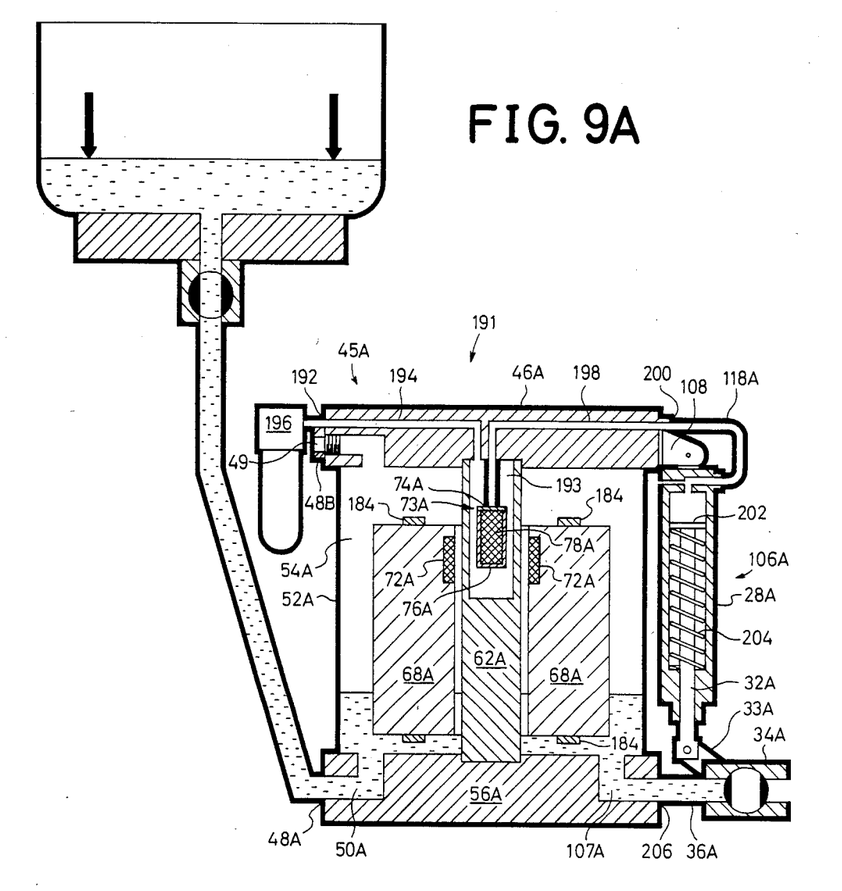
FIGS. 9A and 9B are diagrammatic sectional views of a further embodiment of an automatic drain valve system constructed in accordance with various features of the present invention.
Figure 9B:
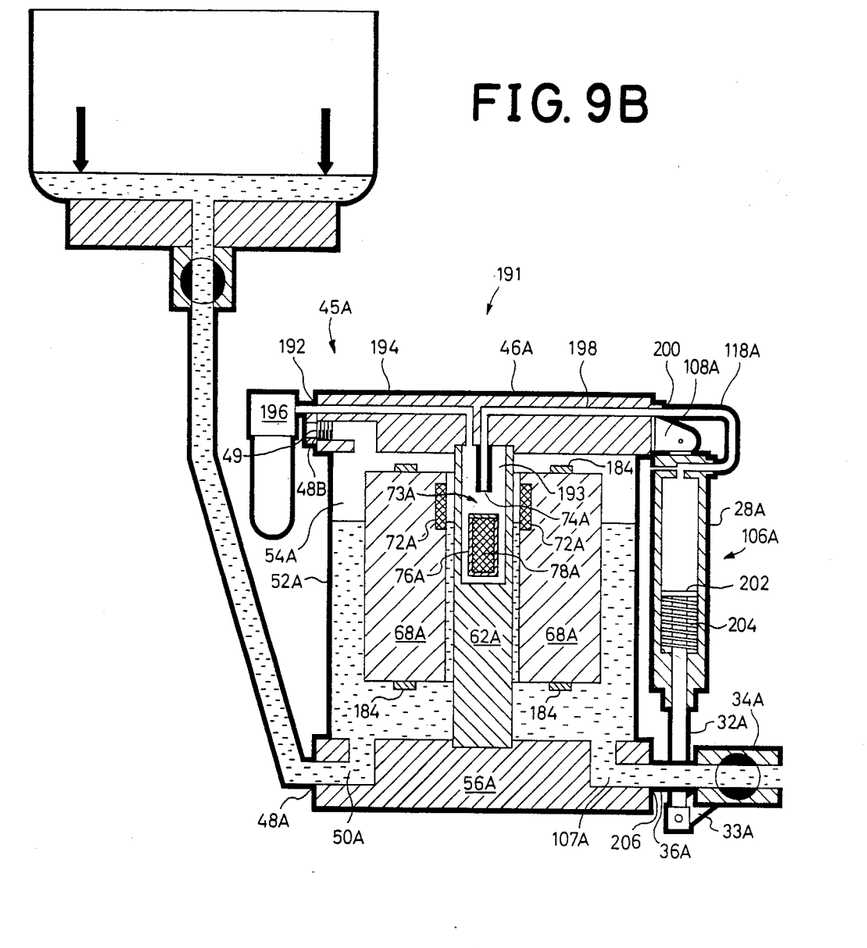

A further embodiment of the automatic drain valve of the present invention is illustrated diagrammatically at 191 in FIGS. 9A and 9B. Certain components of the drain valve 191 which are similar or comparable to components previously described will be referred to by a common numeral followed by an alphabetic character "A" or "B".

The drain valve 191 comprises a separator/reservoir 45A provided with a top housing 46A. As in the previously described embodiment, depending from below the housing 46A is a cylindrial shell or sleeve 52A which forms the side walls of the reservoir, and a base plate 56A forms the bottom of the reservoir, such components being sealed and secured as described hereinabove so as to define a reservoir volume 54A. An inlet 48A is provided in the base plate 56A for connecting to any pneumatic or any other gas system from which condensate or other foreign materials are to be removed, with the inlet 48A communicating with the reservoir volume 54A by way of the channel 50A. It will also be noted that a further inlet port 48B and channel 50B can be provided in the top housing 46A, if desired, and when not in use, can be threadably closed with a suitable bolt 49.

Mounted within the reservoir 45A is a cylinder 62A having an upper end portion defining a cavity 193, the cylinder 62A sealably engaging the upper housing 46A. A bouyant member of float 68A surrounds the cylinder 62A and is slidable along the length of cylinder 62A within the reservoir volume 54A. Mounted within the top of the float 68A or proximate thereto is an annular magnet 72A which encircles the cylinder 62A. It will be noted that the float 62A is provided with protrusions 184 to prevent the float 68A from adhering to the top housing 46A or the base plate 56A due to impurities such as oil which can cause a surface-to-surface bonding that would impede or prevent the proper operation of the unit.

The drain valve 191 is provided with a proximity or control valve 73A (equivalent to the valve 73 of FIG. 2). The valve 73A comprises a valve seat 74A and a valve plug 76A. The valve plug 76A consists of a cylindrical magnet 78A encased in a protective layer as in the embodiment of FIG. 4. As illustrated in FIGS. 9A and 9B, the top housing 46A defines an inlet 192 communicating with the cavity 193 through air supply conduit 194. It will be appreciated that pressurized air is fed through the filter 196 and inlet 192 from a pressurized source (not shown). Further, the top housing 46A further defines a second air supply conduit 198 which establishes fluid communication between the valve seat 74A and an outlet 200.

As with the previous embodiment, a valve 34A and an operator system 106A are also provided, the operator system 106A comprising a cylinder 28A which is attached to the top housing 46A with a yolk member 108A. Fluid communication between the outlet 200 of the top housing 46A and the cylinder 28A is established through pneumatic line 118A, and in the embodiment of FIGS. 9A and 9B, the cylinder 28A slidably houses a piston 202 carrying a downwardly extending piston rod 32A which is pivotably connected to a valve operator 33A of valve 34A. It will be noted that the piston 202 is upwardly spring biased with a spring member 204, thus biasing the valve 34A to a closed position. The base plate 56A is provided with an outlet 206 communicating with the reservoir volume 54A through passageway 107A, and the valve 34A is connected in fluid communication with the outlet 206 with a line 36A.

In order to demonstrate the operation of the drain valve 191, FIG. 9A illustrates the discharge valve 34A, and thus the drain valve 191, in a closed position, whereas, FIG. 9B illustrates the valve 34A in an open position with condensate and other foreign materials being drained from the reservoir 35A. Thus, with regard to the operation of valve 191, as water and condensate enter the reservoir volume 54A through the inlet 48A (and/or the inlet 48B) connected with the pneumatic system, the float 68A will rise causing the cylindrical magnet 78A to drop proximate the position shown in FIG. 9B, the movement and positioning of the cylindrical magnet 78A being a result of interaction with the annular magnet 72A as described hereinabove. The movement of the valve plug 76A from the valve seat 74A allows pressurized air fed into the cavity 193 by air supply conduit 194 to vent from the cavity 193 through air supply conduit 198 and through pneumatic line 118A to the cylinder 28A. With the pressurized air being fed into the cylinder 28A, the piston 202 is forced downwardly overcoming the bias of spring member 204, the piston rod 32A serving to manipulate the valve operator 33A such that the discharge valve 34A is opened to allow the condensate and water to drain from the reservoir 45A. Accordingly, as the water and condensate level lowers within the reservoir 45A, the float 68A is lowered, once again assuming the position illustrated in FIG. 9A, the interaction of the annular magnet 72A and the cylindrical magnet 78A force the valve plug 76A upwardly to sealably engage the valve seat 74A. Since the pressurized air is no longer vented from the cavity 193 to the cylinder 28A, the spring member 204 biases the piston 202 upwardly and resultantly the valve 34A to a closed position.

It will thus be appreciated that, whereas, the automatic drain valve 191 functions much like the previously described embodiment, the drain valve 191 eliminates the need for four-way valve 98, regulator 14, and lubricator 12 of the previous embodiment. This simplification of the mechanism enhances reliability of the unit and at the same time decreases manufacturing and maintenance cost without sacrificing efficiency of operation.

It is of course understood that although a preferred embodiment of the present invention has been illustrated and described, various modifications thereof will become apparent to those skilled in the art. Accordingly, the scope of the invention should only be defined by the appended claims and the equivalents thereof. For example, the drain valve has been illustrated as having a substantially conical cross-sectional outline. It will, of course, be recognized that this valve can assume various geometric configurations, such as a half spherical shape.

We claim:

1. An automatic drain valve system for filter traps used in the accumulation of condensables and foreign materials present in a pneumatic system, which comprises:

a reservoir for collecting said condensables and foreign material, said reservoir including a top housing and a base plate, said reservoir being provided with an inlet and an outlet for flow-through communication with said pneumatic system;

a vertical cylinder mounting within said reservoir, said cylinder having an upper end portion defining a cavity, said cavity being sealed against communication with said reservoir;

a pilot valve mounted axially within said cavity of said cylinder, said pilot valve comprising a sensor tube, a fixed annular seat at a first end of said sensor tube and an axially moving valve plug cooperating with said seat;

an annular buoyant float respondable to liquid in said reservoir surrounding said cylinder and slidable along said cylinder from a low position to a high position;

an annular magnet of one polarity mounted in said float proximate said cylinder;

a second magnet mounted in said valve plug having a magnetic coupling with said annular magnet from said low position to said high position of said float, said second magnet normally having a polarity opposite the polarity of said annular magnet;

a drain valve for said reservoir mounted external to said reservoir, said drain valve having an inlet and an outlet, said inlet communicating with said outlet of said reservoir;

a pneumatic valve operator externally mounted on said reservoir and attached to said drain valve for the opening and closing of said drain valve; and pneumatic means connected between said pilot valve and said valve operator whereby said valve operator quickly opens said drain valve when said float reaches said high position and quickly closes said drain valve when said float reaches said low position, said pneumatic means comprising a first conduit connecting said cavity of said cylinder in fluid communication with a source of filtered air and a second conduit connecting said sensor tube in fluid communication with said pneumatic valve operator.

2. The drain valve system of claim 1 wherein said drain valve is a rotary valve provided with an operating lever for opening and closing said drain valve, and wherein said pneumatic valve operator comprises a cylinder, a piston within said cylinder, and a piston rod connected between said piston and said operating lever of said drain valve, said cylinder being provided with a spring member for biasing said drain valve to a normally closed position.

3. The drain valve system of claim 1 wherein said magnetic coupling causes said polarity of said second magnet to be effectively reversed to match the polarity of said annular magnet when said float reaches said high position and to again become the opposite polarity from said annular magnet when said float reaches said low position.

4. The drain valve system of claim 1 wherein said inlet and outlet for flow through communication with said pneumatic system are located in said base plate of said reservoir.

5. The drain valve system of claim 4 wherein said reservoir is provided with a second inlet for communication with said pneumatic system, said second inlet being located in said top housing.

6. The drain valve system of claim 1 wherein said inlet for communication with said pneumatic system is located in said top housing of said reservoir, and said outlet is located in said base plate of said reservoir.

7. The drain valve system of claim 1 wherein said reservoir further comprises a cylinderical wall having an upper edge releasably attached to said top housing, and a lower edge releasably attached to said base plate, with first sealing means being provided between said wall and said top housing, and second sealing means being provided between said wall and said base plate.

8. An automatic drain valve system for filter traps used in the accumulation of condensables and foreign materials present in a pneumatic system, which comprises:

a reservoir for collecting said condensables and foreign material, said reservoir including a top housing, a cylindrical wall having an upper and lower edge, and a base plate, said upper edge of said cylindrical wall sealably engaging said top housing and said lower edge of said cylindrical wall sealably engaging said base plate, said base plate of said reservoir being provided with an inlet and an outlet for flow-through communication with said pneumatic system, said top housing defining a first and a second conduit, each said conduit having a first and second end, said first end portion of said first conduit defining an inlet for engaging a source of filtered air;

a vertical cylinder mounting within said reservoir, said cylinder having an upper end portion defining a cavity, said cavity being sealed against communication with said reservoir, said upper end portion of said cylinder sealably engaging said top housing such that said first conduit communicates with said cavity;

a pilot valve mounted axially within said cavity of said cylinder, said pilot valve comprising a sensor tube having a first end portion defining a fixed annular seat and a second end portion engaging said top housing at said first end portion of said second conduit so as to establish fluid communications with said second conduit, and comprising an axially moving valve plug within said cavity for cooperating with said seat;

an annular buoyant float respondable to liquid in said reservoir surrounding said cylinder and slidable along said cylinder from a low position to a high position;

an annular magnet of one polarity mounted in said float proximate said cylinder;

a second magnet mounted in said valve plug having a magnetic coupling with said annular magnet from said low position to said high position of said float, said second magnet normally having a polarity opposite the polarity of said annular magnet;

a drain valve for said reservoir mounted external to said reservoir, said drain valve having an inlet and an outlet, said inlet communicating with said outlet of said base plate of said reservoir, said drain valve being provided with an operating lever for opening and closing said drain valve;

a pneumatic valve operator mounted on said top housing external to said reservoir, said valve operator comprising a cylinder, a piston within said cylinder, and a piston rod connected between said piston and said operating lever of said drain valve, said cylinder being provided with a spring member for biasing said drain valve to a normally closed position, said cylinder of said valve operator being provided with a pneumatic line for establishing fluid communication between said cylinder of said valve operator and said second end portion of said second conduit of said top housing.

9. The drain valve system of claim 8 wherein said top housing is provided with a second inlet for communication with said pneumatic system.

* * * * *